United States Patent  
Pell et al.

(10) Patent No.: US 12,352,586 B2
(45) Date of Patent: Jul. 8, 2025

(54) FARMING VEHICLE FIELD BOUNDARY IDENTIFICATION

(71) Applicant: Deere & Company, Moline, IL (US)

(72) Inventors: Edward William Jeffcott Pell, Sunnyvale, CA (US); Brent William West, Redwood City, CA (US)

(73) Assignee: Deere & Company, Moline, IL (US)

( * ) Notice: Subject to any disclaimer, the term of this patent is extended or adjusted under 35 U.S.C. 154(b) by 896 days.

(21) Appl. No.: 17/518,475

(22) Filed: Nov. 3, 2021

(65) Prior Publication Data

US 2022/0136849 A1 May 5, 2022

Related U.S. Application Data

(60) Provisional application No. 63/109,444, filed on Nov. 4, 2020.

(51) Int. Cl.
G01C 21/34 (2006.01)
A01B 69/00 (2006.01)
(Continued)

(52) U.S. Cl.
CPC ........ G01C 21/3461 (2013.01); A01B 69/001 (2013.01); A01B 69/008 (2013.01);
(Continued)

(58) Field of Classification Search
None
See application file for complete search history.

(56) References Cited

U.S. PATENT DOCUMENTS 9,420,741 B2 8/2016 Balutis et al.
2006/0175541 A1 8/2006 Eglington et al.
(Continued)

FOREIGN PATENT DOCUMENTS

CN 104714547 A 6/2015
CN 209983105 U * 1/2020 ......... A01D 41/1278
(Continued)

OTHER PUBLICATIONS

PCT International Search Report and Written Opinion, PCT Application No. PCT/US21/57935, Feb. 1, 2022, 17 pages.
(Continued)

Primary Examiner — Anshul Sood
Assistant Examiner — Wenyuan Yang
(74) Attorney, Agent, or Firm — Fenwick & West LLP

(57) ABSTRACT

A system and a method are disclosed for planning a path within a field for a farming machine. The system predicts boundaries of the field using a previously captured image of the field and generates a suggested route to be taken by a data collection device based on the predicted boundaries. As the data collection device travels along the suggested route, the data collection device collects location data associated with a current layout of the field. The location data may be labeled with obstructions encountered along the way. Based on the location data, the system identifies current boundaries of the field, which may be different from the predicted boundaries. The current boundaries are sent to a verification device to be verified. After the current boundaries have been verified, the path for the farming machine is planned.

18 Claims, 11 Drawing Sheets

(51) Int. Cl.
*A01B 69/04* (2006.01)
*G01C 21/36* (2006.01)
*G06T 7/70* (2017.01)
*G06V 20/10* (2022.01)

(52) U.S. Cl.
CPC ............ *G01C 21/3673* (2013.01); *G06T 7/70* (2017.01); *G06V 20/188* (2022.01); *G06T 2207/10032* (2013.01); *G06T 2207/30188* (2013.01)

(56) References Cited

U.S. PATENT DOCUMENTS

| | | | |
|---|---|---|---|
| 2012/0158299 A1* | 6/2012 | Cerecke | G01C 21/3469 |
| | | | 701/533 |
| 2012/0237083 A1* | 9/2012 | Lange | G06F 16/29 |
| | | | 382/103 |
| 2013/0090850 A1* | 4/2013 | Mays | G01C 21/36 |
| | | | 705/14.63 |
| 2016/0146611 A1 | 5/2016 | Matthews | |
| 2017/0041407 A1 | 2/2017 | Wilbur et al. | |

FOREIGN PATENT DOCUMENTS

| | | |
|---|---|---|
| JP | 2020-529674 A | 10/2020 |
| WO | WO 2019/032648 A1 | 2/2019 |

OTHER PUBLICATIONS

European Patent Office, Extended European Search Report, European Patent Application No. 21890005.8, Aug. 6, 2024, nine pages.

* cited by examiner

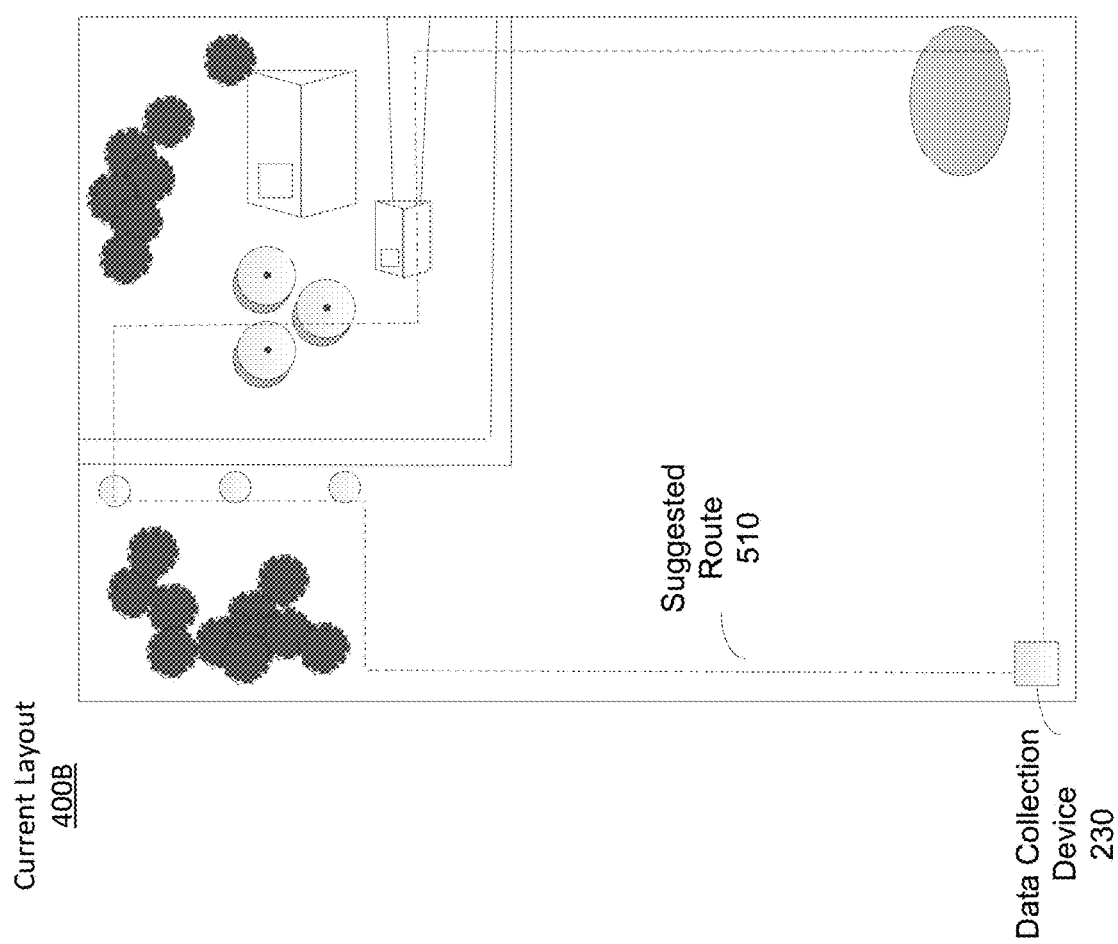

FARMING VEHICLE FIELD BOUNDARY IDENTIFICATION

CROSS REFERENCE TO RELATED APPLICATIONS

This application claims the benefit of U.S. Provisional Application No. 63/109,444 filed Nov. 4, 2020, which is incorporated in its entirety herein by this reference.

BACKGROUND

Field of Disclosure

This disclosure generally relates to farming technology, in particular to identifying boundaries of a field for path planning within the field.

Description of the Related Art

Conventional methods of operating farming machines involve using images of a field (e.g., images captured by one or more farming machines, satellite images) or pre-existing knowledge of the field to identify an area within the field that can be used for farming. After identifying the area, a farming machine management system may generate paths for farming machines to perform operations such as plowing, tilling, planting, and treating plants. For safe and efficient operation of the farming machines, it is important to have an accurate understanding of the layout of the field to identify boundaries of the farmable area. However, the images used to identify the farmable area may be outdated and not accurately represent a current layout of the field. For instance, the images may lack information associated with obstructions present in the field but not previously captured in the image, the images may be misread, or the obstructions in the images may have been moved. Therefore, when the path for the farming machines is generated based on the images that are inaccurate representations of the field, the farming machines may run into obstructions while traveling along the generated path and cause damages or delays in operations. Additionally, the tolerance stack-up associated with the images and tools used to determine field boundaries may result in generating a path that is not sufficiently precise for operating the farming machines.

SUMMARY

A farming machine management system identifies boundaries of a field and plans a path within the boundaries for a farming machine to perform farming operations. The farming machine management system receives an image of the field and predicts boundaries of the field based on the image. The system predicts boundaries of a farmable area by identifying obstructions represented in the image of the field and finding an unobstructed region of the field that does not include the obstructions. The image may be a satellite image or other previously captured images of the field. Based on the predicted boundaries, the farming machine management system generates a suggested route for collecting information representative of a current layout of a field. The suggested route may correspond to a perimeter of the predicted boundaries.

The suggested route is provided to a data collection device that is configured to travel an actual route through the field based on the suggested route for collecting location data associated with the actual route and labelling the location data with information representing the current layout of the field. In one embodiment, the suggested route is visually overlaid on the image of the field and provided to the data collection. In another embodiment, the suggested route is provided as a set of navigation instructions with respect to a starting point on the field, such that the data collection device can travel through the field to collect the location data. The data collection device may be controlled by an operator (e.g., an employee associated with the farming management system, a third party individual, an individual associated with the field) that reviews the suggested route and travels along the actual route to collect information representing the current layout of the field.

As the data collection device travels the actual route, the data collection device may collect location data that tracks the motion of the data collection device using the global positioning system (GPS). At least a portion of the actual route may deviate from the suggested route. For example, the suggested route may suggest that the data collection device travel through an obstruction that was not present in the image but lies along the suggested route in the current layout of the field. The operator may travel around the obstruction in the actual route and collect location data associated with the obstruction. The operator may label the location data and identify a type of object (e.g., a fence, a building, a power pole, a lamppost) associated with the obstruction.

The operator may also collect information on areas of the field that are not suitable for farming. For example, a portion of the field may include a grass waterway for drainage, which may be driven through but not used for farming. The operator may label the portion of the field as a grass waterway or another label to indicate that the portion should not be included in the updated boundaries since it cannot be used for farming. The labelled location data is provided to the farming machine management system and compared to the predicted boundaries to generate the suggested route.

The farming machine management system identifies current boundaries of the current layout of the field based on the comparison of the image of the field or other previously known information to the labelled location data. In one embodiment, when the labelled location data indicates that there is an obstruction in the current layout of the field that was not represented in the image of the field, the current boundaries may be modified to exclude the obstruction. In another embodiment, when the labelled location data indicates that an obstruction is at a different location compared to where it was in the image of the field, the farming machine management system modifies the current boundaries based on the difference in the locations. The farming machine management system may apply a machine learning model to identify the current boundaries. The current boundaries are transmitted to a verification device in a request to verify the current boundaries. When the current boundaries are verified by a user of the verification device, the farming machine management system plans a path for the farming machine within current boundaries.

BRIEF DESCRIPTION OF DRAWINGS

FIG. 4A illustrates a satellite image of a field, in accordance with an embodiment of the present disclosure.

FIG. 4B illustrates a current layout of a field, in accordance with an embodiment of the present disclosure.

FIG. 5A illustrates a suggested route for collecting location data associated with a field generated based on a satellite image of the field, in accordance with an embodiment of the present disclosure.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. Introduction

To manage farming operations, farmers may use services of a farming machine management system that determines a current layout of the field to identify the regions within the field that can be used for farming. Based on the determined current layout, the farming machine management system generates a path for farming machines within boundaries of farmable area. Farming machines tend to be large in size, and it is important to identify safe boundaries to prevent damage and maintain a safe working environment for operators while maximizing usage of the field. The farming machine management system may initially predict the layout of the field based on previously known information associated with the field and predict boundaries of the field that can be used for farming. The information may be satellite images or images captured by imaging systems on one or more farming machines that operate within the field. However, these images may not be an accurate representation of the current layout of the field.

To collect information describing the current layout of the field, the farming machine management system instructs a data collection device to travel along a suggested route associated with the predicted boundaries and collect location data associated with an actual route taken by the data collection device and label the location data with information associated with obstructions encountered by the data collection device along the way. The farming management system determines updated boundaries of the field and provides the updated boundaries to a verification device to be verified by a user. After the updated boundaries are verified, the farming machine management system generates a path within the updated boundaries to be taken by farming machines to perform farming operations.

II. Farming Machine Configurations

Figure 1A:
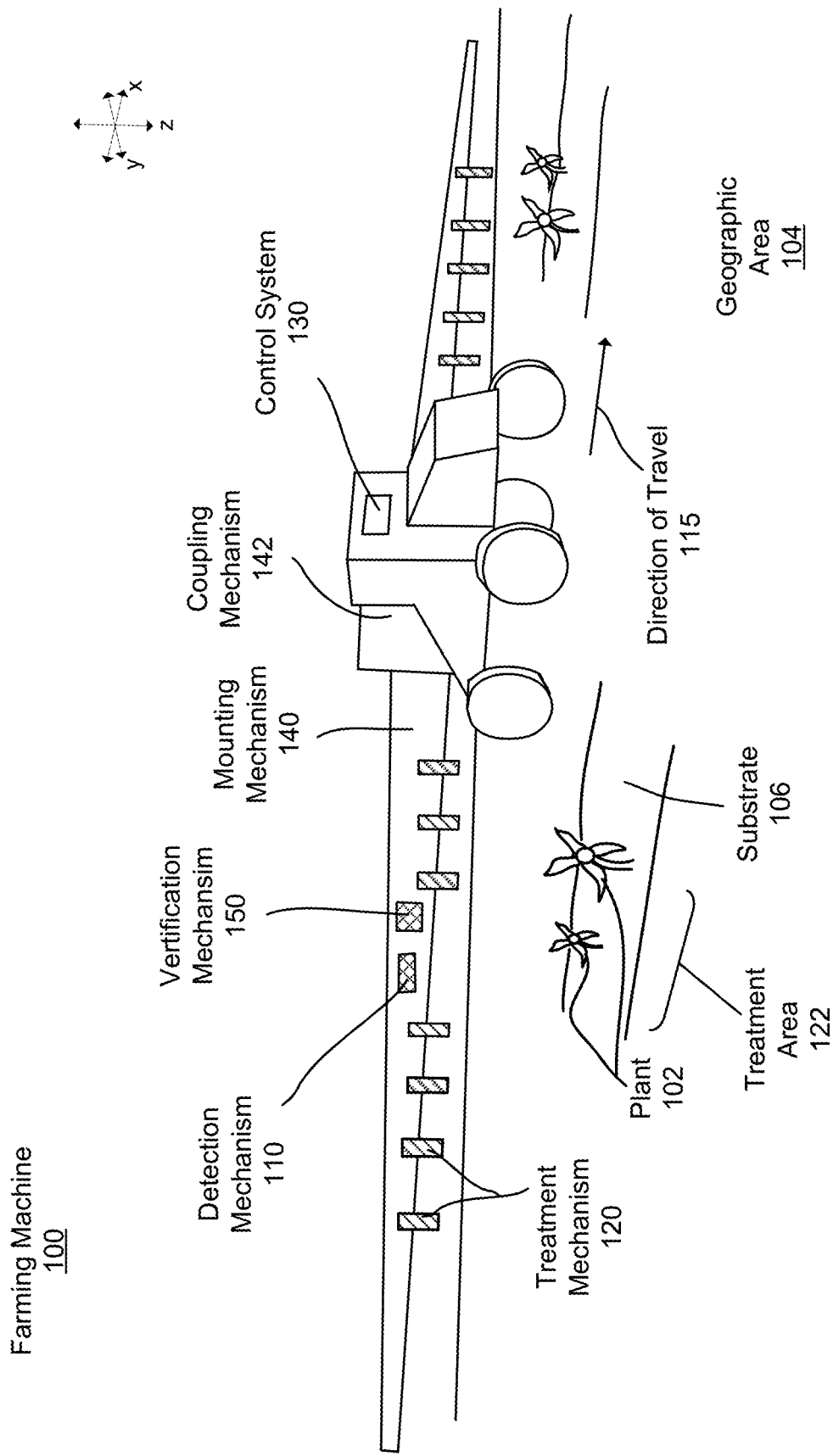
FIG. 1A illustrates an isometric view of a farming machine, in accordance an embodiment of the present disclosure.
Figure 1B:
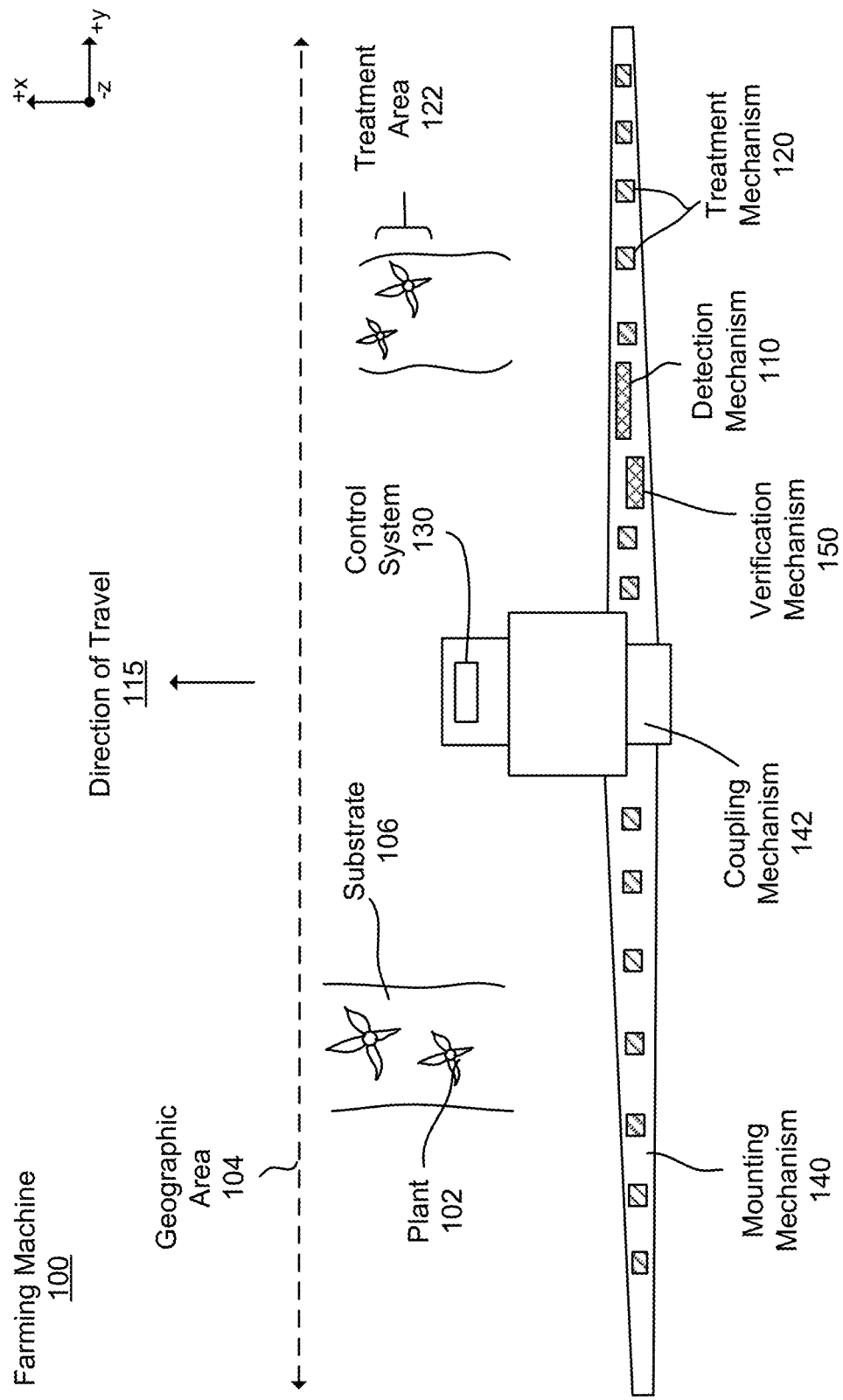
FIG. 1B illustrates a top view of a farming machine, in accordance with an embodiment of the present disclosure.
Figure 1C:
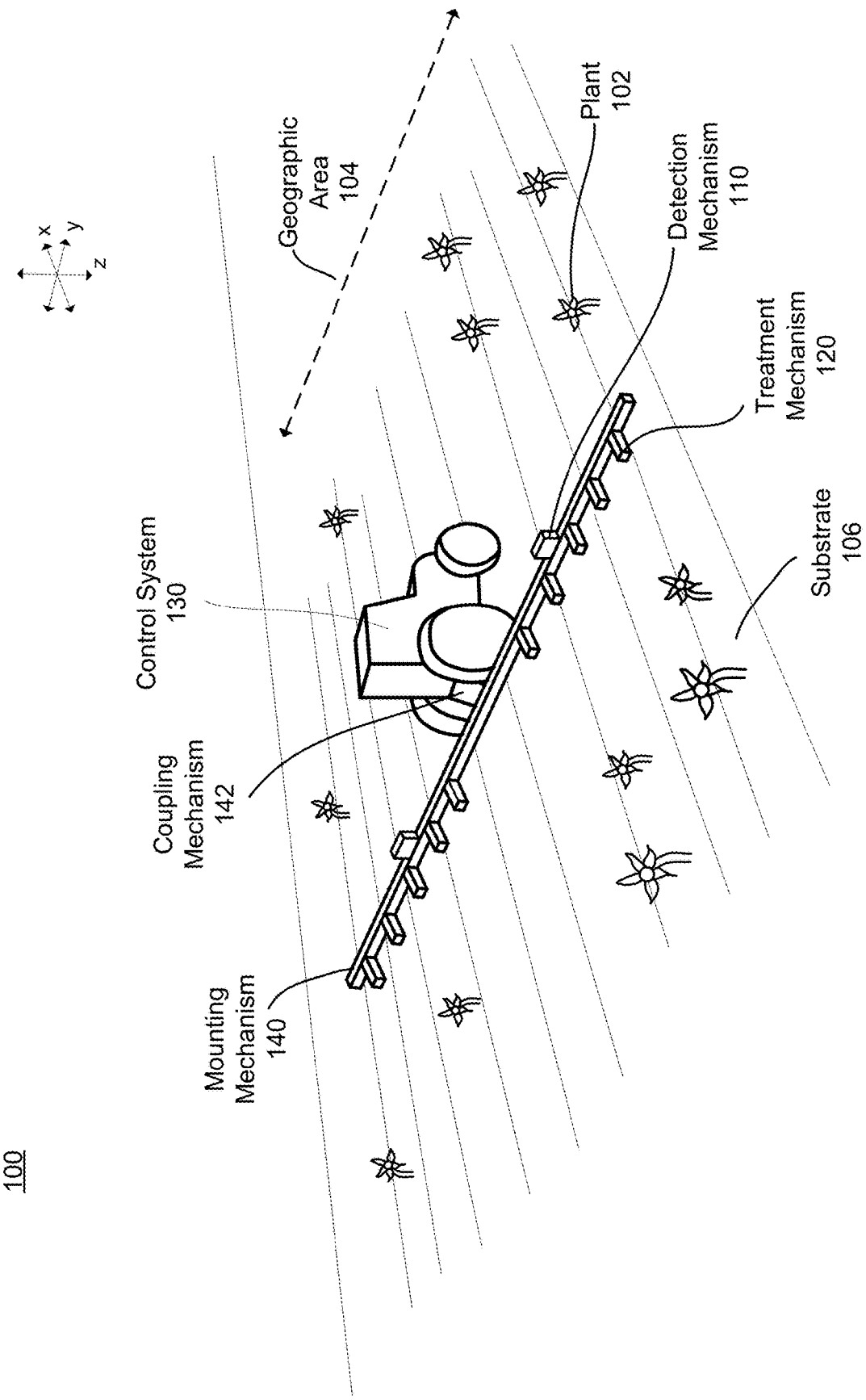
FIG. 1C illustrates an isometric view of a farming machine, in accordance an embodiment of the present disclosure.

FIGS. 1A-1C illustrate various views of a farming machine 100, in accordance an embodiment of the present disclosure. A farming machine that identifies and treats plants may have a variety of configurations, some of which are described in greater detail below. The farming machine 100, illustrated in FIGS. 1A-1C, includes a detection mechanism 110, a treatment mechanism 120, and a control system 130. The farming machine 100 can additionally include a mounting mechanism 140, a verification mechanism 150, a power source, digital memory, communication apparatus, or any other suitable component. The farming machine 100 can include additional or fewer components than described herein. Furthermore, the components of the farming machine 100 can have different or additional functions than described below.

The farming machine 100 functions to apply a treatment to one or more plants 102, the ground, or the substrate 106 within a geographic area 104. Often, treatments function to regulate plant growth. The treatment is directly applied to a single plant 102, but can alternatively be directly applied to multiple plants, indirectly applied to one or more plants, applied to the environment associated with the plant (e.g., soil, atmosphere, or other suitable portion of the plant environment adjacent to or connected by an environmental factor, such as wind), or otherwise applied to the plants. Treatments that can be applied include necrosing the plant, necrosing a portion of the plant (e.g., pruning), regulating plant growth, or any other suitable plant treatment. Necrosing the plant can include dislodging the plant from the supporting substrate 106, incinerating a portion of the plant, applying a treatment concentration of working fluid (e.g., fertilizer, hormone, water, etc.) to the plant, or treating the plant in any other suitable manner. Regulating plant growth can include promoting plant growth, promoting growth of a plant portion, hindering (e.g., retarding) plant or plant portion growth, or otherwise controlling plant growth. Examples of regulating plant growth includes applying growth hormone to the plant, applying fertilizer to the plant or substrate, applying a disease treatment or insect treatment to the plant, electrically stimulating the plant, watering the plant, pruning the plant, or otherwise treating the plant. Plant growth can additionally be regulated by pruning, necrosing, or otherwise treating the plants adjacent to the plant.

The plants 102 can be crops, but can alternatively be weeds or any other suitable plant. The crop may be cotton, but can alternatively be lettuce, soy beans, rice, carrots, tomatoes, corn, broccoli, cabbage, potatoes, wheat or any other suitable commercial crop. The plant field in which the system is used is an outdoor plant field, but can alternatively be plants within a greenhouse, a laboratory, a grow house, a set of containers, a machine, or any other suitable environment. The plants are grown in one or more plant rows (e.g., plant beds), wherein the plant rows are parallel, but can alternatively be grown in a set of plant pots, wherein the plant pots can be ordered into rows or matrices or be randomly distributed, or be grown in any other suitable configuration. The crop rows are generally spaced between 2 inches and 45 inches apart (e.g. as determined from the longitudinal row axis), but can alternatively be spaced any suitable distance apart, or have variable spacing between multiple rows.

The plants 102 within each plant field, plant row, or plant field subdivision generally includes the same type of crop (e.g., same genus, same species, etc.), but can alternatively include multiple crops (e.g., a first and a second crop), both of which are to be treated. Each plant 102 can include a stem, arranged superior to (e.g., above) the substrate 106, which supports the branches, leaves, and fruits of the plant. Each plant can additionally include a root system joined to the stem, located inferior to the substrate plane (e.g., below ground), that supports the plant position and absorbs nutrients and water from the substrate 106. The plant can be a vascular plant, non-vascular plant, ligneous plant, herbaceous plant, or be any suitable type of plant. The plant can have a single stem, multiple stems, or any number of stems. The plant can have a tap root system or a fibrous root system. The substrate 106 is soil, but can alternatively be a sponge or any other suitable substrate.

The detection mechanism 110 is configured to identify a plant for treatment. As such, the detection mechanism 110 can include one or more sensors for identifying a plant. For example, the detection mechanism 110 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. In one embodiment, and described in greater detail below, the detection mechanism 110 includes an array of image sensors configured to capture an image of a plant. In some example systems, the detection mechanism 110 is mounted to the mounting mechanism 140, such that the detection mechanism 110 traverses over a geographic location before the treatment mechanism 120 as the farming machine 100 moves traverses through the geographic location. However, in some embodiments, the detection mechanism 110 traverses over a geographic location at substantially the same time as the treatment mechanism 120. In an embodiment of the farming machine 100, the detection mechanism 110 is statically mounted to the mounting mechanism 140 proximal the treatment mechanism 120 relative to the direction of travel 115. In other systems, the detection mechanism 110 can be incorporated into any other component of the farming machine 100.

The treatment mechanism 120 functions to apply a treatment to an identified plant 102. The treatment mechanism 120 applies the treatment to the treatment area 122 as the farming machine 100 moves in a direction of travel 115. The effect of the treatment can include plant necrosis, plant growth stimulation, plant portion necrosis or removal, plant portion growth stimulation, or any other suitable treatment effect as described above. The treatment can include plant 102 dislodgement from the substrate 106, severing the plant (e.g., cutting), plant incineration, electrical stimulation of the plant, fertilizer or growth hormone application to the plant, watering the plant, light or other radiation application to the plant, injecting one or more working fluids into the substrate 106 adjacent the plant (e.g., within a threshold distance from the plant), or otherwise treating the plant. In one embodiment, the treatment mechanisms 120 are an array of spray treatment mechanisms. The treatment mechanisms 120 may be configured to spray one or more of: an herbicide, a fungicide, insecticide, some other pesticide, or water. The treatment mechanism 120 is operable between a standby mode, wherein the treatment mechanism 120 does not apply a treatment, and a treatment mode, wherein the treatment mechanism 120 is controlled by the control system 130 to apply the treatment. However, the treatment mechanism 120 can be operable in any other suitable number of operation modes.

The farming machine 100 may include one or more treatment mechanisms 120. A treatment mechanism 120 may be fixed (e.g., statically coupled) to the mounting mechanism 140 or attached to the farming machine 100 relative to the detection mechanism 110. Alternatively, the treatment mechanism 120 can rotate or translate relative to the detection mechanism 110 and/or mounting mechanism 140. In one variation, the farming machine 100a includes a single treatment mechanism, wherein the treatment mechanism 120 is actuated or the farming machine 100a moved to align the treatment mechanism 120 active area 122 with the targeted plant 102. In a second variation, the farming machine 100 includes an assembly of treatment mechanisms, wherein a treatment mechanism 120 (or subcomponent of the treatment mechanism 120) of the assembly is selected to apply the treatment to the identified plant 102 or portion of a plant in response to identification of the plant and the plant position relative to the assembly. In a third variation, the farming machine 100 includes an array of treatment mechanisms 120, wherein the treatment mechanisms 120 are actuated or the farming machine 100 is moved to align the treatment mechanism 120 active areas 122 with the targeted plant 102 or plant segment.

The farming machine 100 includes a control system 130 for controlling operations of system components. The control system 130 can receive information from and/or provide input to the detection mechanism 110, the verification mechanism 150, and the treatment mechanism 120. The control system 130 can be automated or can be operated by a user. In some embodiments, the control system 130 may be configured to control operating parameters of the farming machine 100 (e.g., speed, direction). The control system 130 also controls operating parameters of the detection mechanism 110. Operating parameters of the detection mechanism 110 may include processing time, location and/or angle of the detection mechanism 110, image capture intervals, image capture settings, etc. The control system 130 may be a computer, as described in greater detail below in relation to FIG. 8. The control system 130 can apply one or more models to identify one or more plants in the field. For example, the control system 130 applies a plant identification module that utilizes depth and label information to identify plants in the field, described in greater detail below. The control system 130 may be coupled to the farming machine 100 such that an operator (e.g., a driver) can interact with the control system 130. In other embodiments, the control system 130 is physically removed from the farming machine 100 and communicates with system components (e.g., detection mechanism 110, treatment mechanism 120, etc.) wirelessly.

In some configurations, the farming machine 100 includes a mounting mechanism 140 that functions to provide a mounting point for the system components. In one example, the mounting mechanism 140 statically retains and mechanically supports the positions of the detection mechanism 110, the treatment mechanism 120, and the verification mechanism 150 relative to a longitudinal axis of the mounting mechanism 140. The mounting mechanism 140 is a chassis or frame, but can alternatively be any other suitable mounting mechanism. In an embodiment, the mounting mechanism 140 extends outward from a body of the farming machine 100 in the positive and negative y-direction such that the mounting mechanism 140 is approximately perpendicular to the direction of travel 115. The mounting mechanism 140 includes an array of treatment mechanisms 120 positioned laterally along the mounting mechanism 140. In alternate configurations, there may be no mounting mechanism 140, the mounting mechanism 140 may be alternatively positioned, or the mounting mechanism 140 may be incorporated into any other component of the farming machine 100.

The farming machine 100 includes a first set of coaxial wheels and a second set of coaxial wheels, wherein the rotational axis of the second set of wheels is parallel with the rotational axis of the first set of wheels. In the first embodiment, each wheel in each set is arranged along an opposing side of the mounting mechanism 140 such that the rotational axes of the wheels are approximately perpendicular to the mounting mechanism 140. In the second and third embodiments of the farming machine, the rotational axes of the wheels are approximately parallel to the mounting mechanism 140. In alternative embodiments, the system can include any suitable number of wheels in any suitable configuration. The farming machine 100 may also include a coupling mechanism 142, such as a hitch, that functions to removably or statically couple to a drive mechanism, such as a tractor, more to the rear of the drive mechanism (such that the farming machine 100 is dragged behind the drive mechanism), but can alternatively be attached to the front of the drive mechanism or to the side of the drive mechanism. Alternatively, the farming machine 100 can include the drive mechanism (e.g., a motor and drivetrain coupled to the first and/or second set of wheels). In other example systems, the system may have any other means of traversing through the field.

In some configurations, the farming machine 100 additionally includes a verification mechanism 150 that functions to record a measurement of the ambient environment of the farming machine 100. The farming machine may use the measurement to verify or determine the extent of plant treatment. The verification mechanism 150 records a measurement of the geographic area previously measured by the detection mechanism 110. The verification mechanism 150 records a measurement of the geographic region encompassing the plant treated by the treatment mechanism 120. The verification mechanism 150 measurement can additionally be used to empirically determine (e.g., calibrate) treatment mechanism operation parameters to obtain the desired treatment effect. The verification mechanism 150 can be substantially similar (e.g., be the same type of mechanism as) the detection mechanism 110, or can be different from the detection mechanism 110. In some embodiments, the verification mechanism 150 is arranged distal the detection mechanism 110 relative the direction of travel, with the treatment mechanism 120 arranged there between, such that the verification mechanism 150 traverses over the geographic location after treatment mechanism 120 traversal. However, the mounting mechanism 140 can retain the relative positions of the system components in any other suitable configuration. In other configurations of the farming machine 100, the verification mechanism 150 can be included in other components of the system.

In some configurations, the farming machine 100 may additionally include a power source, which functions to power the system components, including the detection mechanism 110, control system 130, and treatment mechanism 120. The power source can be mounted to the mounting mechanism 140, can be removably coupled to the mounting mechanism 140, or can be separate from the system (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the farming machine 100.

In some configurations, the farming machine 100 may additionally include a communication apparatus, which functions to communicate (e.g., send and/or receive) data between the control system 130 and a set of remote devices. The communication apparatus can be a Wi-Fi communication system, a cellular communication system, a short-range communication system (e.g., Bluetooth, NFC, etc.), or any other suitable communication system.

III. System Environment

Figure 2:
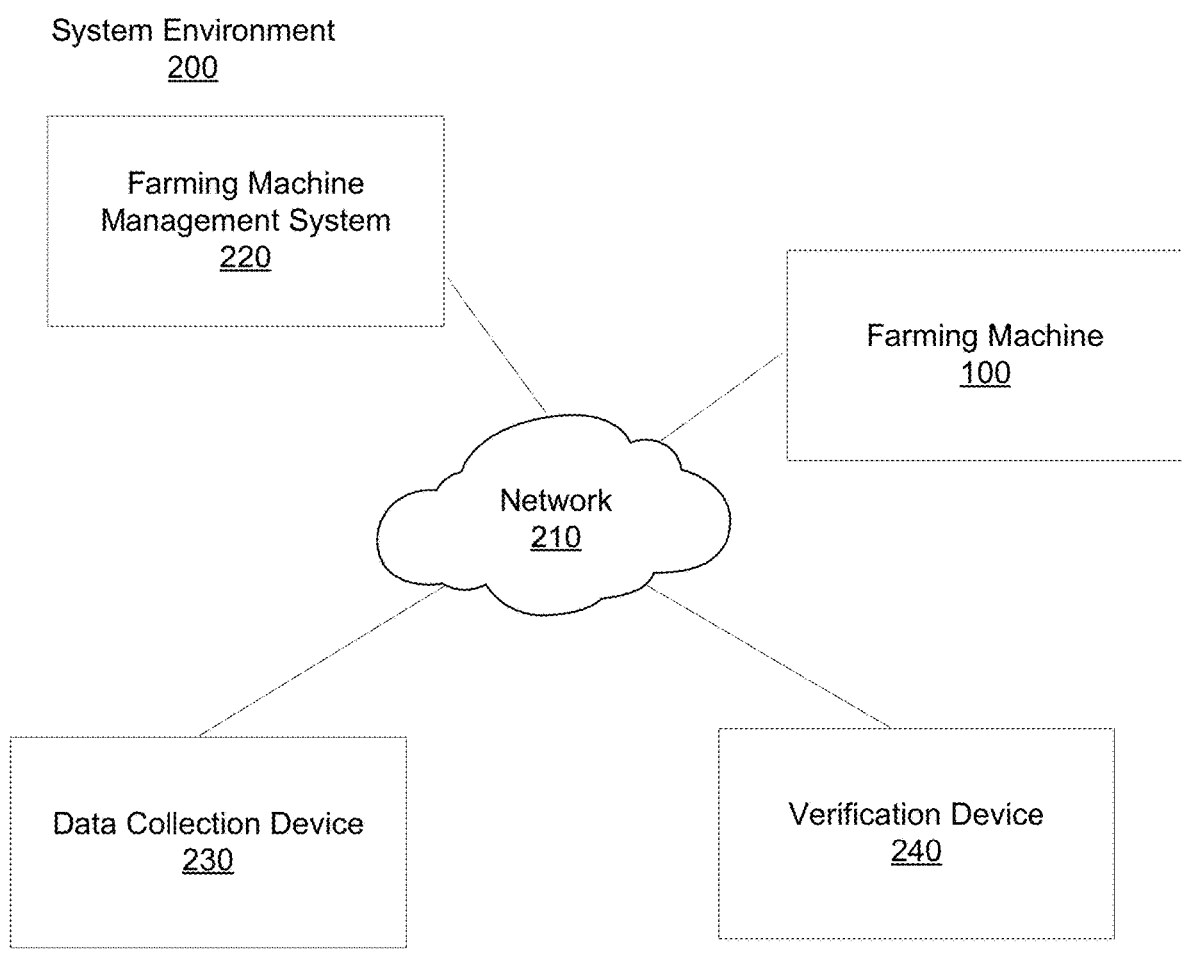
FIG. 2 is a block diagram of a system environment in which a farming machine operates, in accordance with an embodiment of the present disclosure.

FIG. 2 is a block diagram of a system environment 200 in which a farming machine 100 operates, in accordance with an embodiment of the present disclosure. The system environment 200 includes a network 210, a farming machine management system 220, a data collection device 230, a verification device 240, and the farming machine 100. The system environment 200 may have alternative configurations than shown in FIG. 2 and include different, fewer, or additional components.

The farming machine management system 220 identifies boundaries of a field that the farming machine 100 is operating in and plans a path for the farming machine 100 based on the identified boundaries. The farming machine management system 220 may initially generate a suggested route around a perimeter of predicted boundaries of the field based on images of the field. The images may be satellite images and/or images captured by cameras installed on farming machines 100 or other types of images. The farming machine management system 220 provides the suggested route to take for collecting information representative of a current layout of the field to the data collection device 230.

The farming machine management system 220 receives location data collected by the data collection device 230 while traveling along the suggested route. The received location data is labelled with information describing the current layout of the field. The farming machine management system 220 updates the boundaries to reflect farmable area in the current layout of the field using the received location data. The identified boundaries are presented to the verification device 240. Responsive to receiving confirmation that the identified boundaries are accurate, the farming machine management system 220 generates a path within the field for operating the farming machine 100. The generated path may be provided to the farming machine 100. Details on the farming machine management system 220 is described with respect to FIG. 3.

The data collection device 230 and the verification device 240 are one or more computing devices capable of receiving user input as well as transmitting and/or receiving data via the network 210. In one embodiment, a computing device is a conventional computer system, such as a desktop or laptop computer. Alternatively, a computing device may be a device having computer functionality, such as a personal digital assistant (PDA), a mobile telephone, a smart phone or another suitable device. A computer device is configured to communicate via the network 210. In one embodiment, a computing device executes an application allowing a user of the computing device to interact with the farming machine management system 220. For example, a computing device executes a browser application to enable interaction between the computing device and the farming machine management system 220 via the network 210. In another embodiment, a computing device interacts with the farming machine management system 220 through an application programming interface (API) running on a native operating system of the computer device, such as IOS® or ANDROID™.

The computing devices are configured to communicate via the network 210, which may comprise any combination of local area and/or wide area networks, using both wired and/or wireless communication systems. In one embodiment, the network 210 uses standard communications technologies and/or protocols. For example, the network 210 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 210 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 210 may be represented using any suitable format, such as hypertext markup language (HTML) or extensible markup language (XML). In some embodiments, all or some of the communication links of the network 210 may be encrypted using any suitable technique or techniques.

The data collection device 230 is configured to collect location data and information describing the current layout of the field. The data collection device 230 may be used by an operator such as an employee associated with the farming machine management system 220, a third party individual, or an individual associated with the field (e.g., a farmer that owns the field). In some embodiments, the data collection device 230 is a drone or a computing device integrated into a vehicle (e.g., farming machine, car, off-road vehicle). The data collection device 230 receives the suggested route generated by the farming machine management system 220 and collects location data and information describing the current layout of the field as it travels along an actual route. The suggested route may be a perimeter of the predicted boundaries of the field and may be displayed on the image that was used to determine the suggested route via a graphical user interface (GUI).

The information collected by the data collection device 230 describing the current layout of the field may be additional images of the obstructions, identification of the type of obstruction, dimensions of the obstruction, information related to field boundaries, and other pertinent information for a more accurate representation of the current layout of the field. The collected location data and the information describing the current layout of the field may describe obstructions within the predicted boundaries that may prevent the farming machine 100 from being able to travel through a portion of the field. For example, the obstructions may be buildings, fences, tilling equipment, rocks, waterways, roads, highways, and other structures. The data collection device 230 may include a global positioning system (GPS) that collects location data to track the motion of the data collection device 230 as it travels. As the data collection device 230 travels along the actual route, the data collection device 230 may label the location data with additional information describing the current layout by pinning labels associated with the obstructions or images of the obstructions to a location in the field via the GUI. The data collection device 230 provides the labelled location data to the farming machine management system 220. The farming management system 220 uses the labelled location data from the data collection device 230 to determine current boundaries of the current layout of the field.

The verification device 240 is a computing device used to receive the current boundaries of the field from the farming machine management system 220 after the current boundaries have been updated using the labelled location data from the data collection device 230. The verification device 240 may present the determined boundaries to a user (e.g., farmer that owns the field) via a graphical user interface (GUI) to be verified by the user. The user may provide additional constraints or flag mistakes in the determined boundaries using the GUI. For example, if the user has plans to add a permanent structure within the identified boundaries, the user may provide information associated with the structure to the farming machine management system 220 and request that the boundaries be updated to not include the structure.

The farming machine 100 is configured to perform farming operations along a path determined by the farming machine management system 220. After the farming machine management system 220 receives verification on the boundaries of the field from the verification device 240, the farming machine 100 plans the path for the farming machine 100 and generates instructions for the farming machine 100 to perform the farming operations along the path.

IV. Farming Machine Management System

Figure 3:
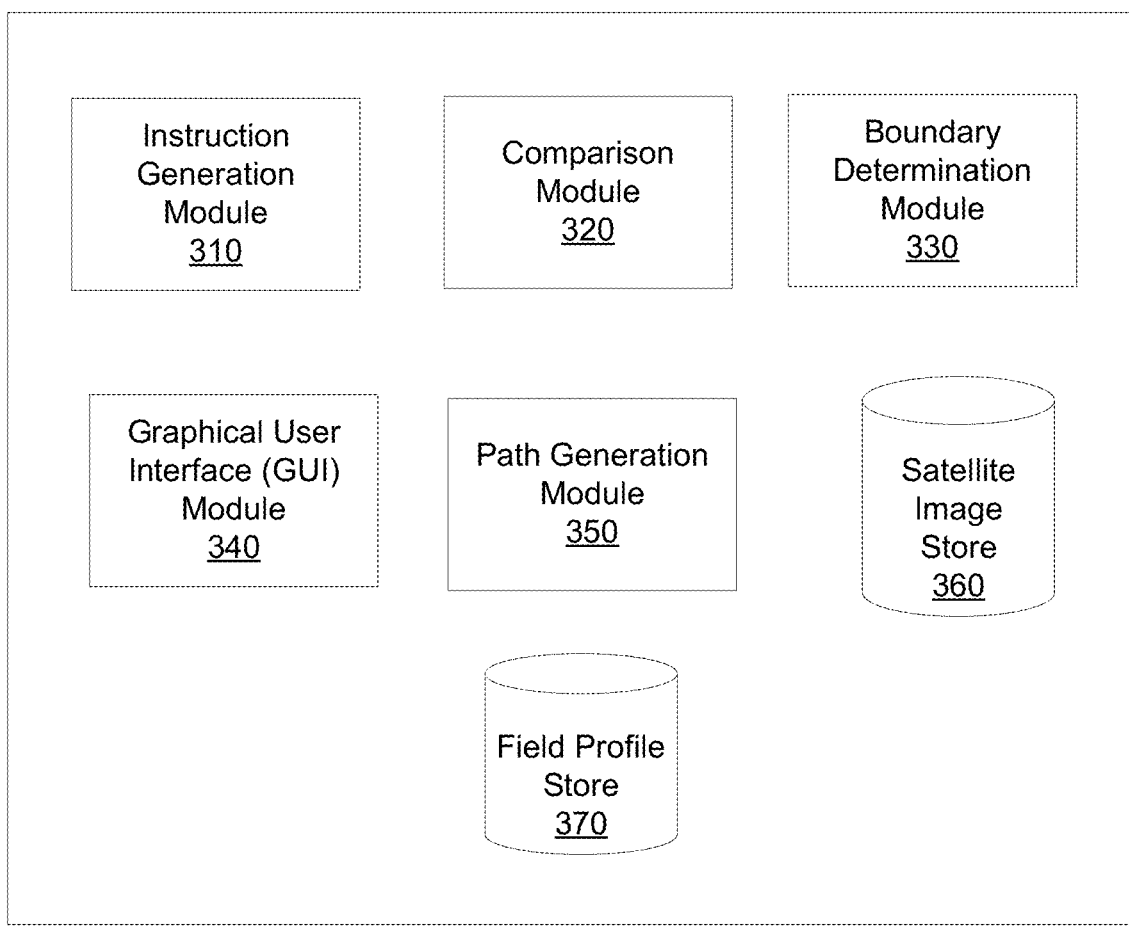
FIG. 3 is a block diagram of a farming machine management system, in accordance with an embodiment of the present disclosure.

FIG. 3 is a block diagram of a farming machine management system 220, in accordance with an embodiment of the present disclosure. The farming machine management system 220 includes an instruction generation module 310, a comparison module 320, a boundary determination module 330, a graphical user interface (GUI) module 340, a path generation module 350, a satellite image store 360, and a field profile store 370. In alternative embodiments, the farming machine management system 220 may include additional, fewer, and/or different components than described herein.

The instruction generation module 310 generates a suggested route around predicted boundaries of a field and provides the suggested route to the data collection device 230. The instruction generation module 310 may access previously known information about the field such as satellite images of the field stored in the satellite image store 360 and/or additional images or characteristics associated with the field stored in the field profile store 370. Based on the previously known information, the instruction generation module 310 determines the predicted boundaries of the field that encompass farmable area of the field by excluding obstructions detected in the previously known information. In some embodiments, the instruction generation module 310 performs object detection to identify and locate various obstructions in the previously known information. For example, the instruction generation module 310 may apply one or more machine learning models that receive the previously known information as input and output bounding boxes around the obstructions and types of objects associated with the obstructions. In some embodiments, the instruction generation module 310 presents the previously known information to human annotators that provide labels associated with the obstructions represented in the previously known information. Some of the obstructions identified in the previously known information (e.g., roads, fences) may be representative of boundaries of the field, and the instruction generation module 310 may determine the predicted boundaries to be within these obstructions.

In some embodiments, the instruction generation module 310 may provide the suggested route overlaid on a map or a satellite image of the field to the data collection device 230. Alternatively, the instruction generation module 310 may be provide navigation instructions along the suggested route. For example, the instruction generation module 310 may provide a starting point to the data collection device 230 and instruct the data collection device 230 to travel 500 meters north to point A, turn right at point A, and travel 1000 meters east to point B, and etc.

Responsive to receiving the suggested route, the data collection device 230 may travel along an actual route. When the predicted boundaries are accurate, the actual route travelled by the data collection device 230 may be substantially be the same as the suggested route. However, when there are obstructions that were not accounted for in the suggested route, the actual route of the data collection device 230 may deviate from the suggested route to record information representing the current layout of the field including the unaccounted obstructions. Accordingly, data from the actual route may be used to determine the current layout of the field.

As the data collection device 230 travels the actual route through the field based on the suggested route, the data collection device 230 collects location data and labels location data with information that describes the current layout of the field. The data collection device 230 may include a GPS that continuously tracks the position of the data collection device 230 along the actual route. The data collection device 230 may label obstructions encountered as it travels the actual route such that the planned path for the farming machine may avoid the obstructions. To label the location data, the data collection device 230 may identify the types of obstructions detected or capture images.

The comparison module 320 receives the labelled location data from the data collection device 230 and compares it to the previously known information that was used to generate the suggested route. The comparison module 320 may identify incorrect boundaries based on differences between the previously known information and the labelled location data. The comparison module 320 provides the differences to the boundary determination module 330 such that the boundary determination module 330 may determine updated boundaries of the field. In some embodiments, the differences may include newly detected obstructions from the labelled location data such as a new building that was constructed since a time at which the previously known information was collected. In some embodiments, the differences may include changes in positions of obstructions or removal of obstructions. For example, a farming equipment may have been at a first location in the satellite image, and the suggested route may have been generated to avoid the farming equipment. However, the labelled location data may indicate that the farming equipment was moved from the first location to a second location.

The boundary determination module 330 determines updated boundaries of the current layout of the field based in part on the comparison performed by the comparison module 320. The updated boundaries may be different from the predicted boundaries that were determined without the labelled location data. Compared to the predicted boundaries, the updated boundaries may cover a smaller or a larger area and/or have a different shape. When the comparison indicates that there are additional obstructions, the updated boundaries are adjusted to exclude the additional obstructions. When the comparison indicates that there are obstructions that have been removed, the updated boundaries are expanded to include locations corresponding to the removed obstructions.

In some embodiments, the boundary determination module 330 may present the comparison results from the comparison module 320 to a user associated with the farming machine management system 220 trained to review the results and determine updated boundaries. The comparison results may be presented along with the previously determined information about the field, labelled location data, and/or additional images provided by the data collection device 230. In response, the user may determine the updated boundaries by interacting with graphically elements in a GUI. For example, the user may adjust the predicted boundaries by dragging and moving graphical elements representative of the predicted boundaries to represent the updated boundaries.

In some embodiments, the boundary determination module 330 may be implemented using a variety of types of machine learning models or trainable networks. For example, the one or more machine learning models may be a neural network, decision tree, or other type of computer model, and any combination thereof. The machine learning models may be trained using a training set of historical satellite images and historical labelled location information. The machine learning models may output bounding boxes in the satellite images, the bounding boxes including updated boundaries around farmable areas within fields. In some embodiments, the output of the machine learning models may be verified by a person.

The GUI module 340 generates a GUI that is presented to the data collection device 230 and the verification device 240. The GUI module 340 may include one or more functions such that users of the data collection device 230 and the verification device 240 may interact with the GUI and provide input to the farming machine management system 220.

The path generation module 350 generates a path within the updated boundaries to be travelled by the farming machine 100. The path generation module 350 may generate the path based on a type of plant to be planted, a type of farming machines to be operated, and other factors. After generating the path, the path generation module 350 provides instructions to the farming machine 100 to navigate along the path.

The satellite image store 360 stores satellite images of fields managed by the farming machine management system 220. In some embodiments, the stored satellite images may be updated periodically.

The field profile store 370 stores information associated with fields. The information may include characteristics associated with the field such as geographical layout of the field, types of crops grown, information provided by users associated with the field, and information determined by the farming machine management system 220.

V. Example of Determining Boundaries of a Field

FIG. 4A illustrates a satellite image 400A of a field 405, in accordance with an embodiment of the present disclosure. The satellite image 400A illustrates a top-down view of the field 405 and includes trees 415, and a building 410. Based on the satellite image 400A and other previously known information associated with the field 405, the farming machine management system 220 may predict boundaries 440 of the farmable area within the field 405. The predicted boundaries 440 do not surround the trees 415 and the building 410 because those areas cannot be used for farming.

FIG. 4B illustrates a current layout 400B of a field, in accordance with an embodiment of the present disclosure. The current layout 400B includes obstructions that are not represented in the satellite image 400A. For example, lampposts 420, silos 430, a driveway 425, a fence 440, and a pond 435 are not captured in the satellite image 400A. Since the predicted boundaries 440 are not an accurate representation of the actual farmable area within the field 405, a path planned based on the predicted boundaries 440 may be unreliable.

FIG. 5A illustrates a suggested route 510 for collecting location data associated with a field 405 generated based on a satellite image 400A of the field 405, in accordance with an embodiment of the present disclosure. The farming machine management system 220 may generate the suggested route 510 around a perimeter of the predicted boundaries 440 determined based on the satellite image 400A. The suggested route 510 may be provided to the data collection device 230 to instruct an operator associated with the data collection device 230 to travel along the suggested route 510 and collect location data and information representing the current layout of the field.

The farming machine management system 220 may generate driving instructions for the data collection device 230 to travel around the field 405. The farming machine management system 220 may select a starting point for the data collection device 230 and instruct the operator of the data collection device 230 to move to the starting point. The farming machine management system 220 may present the field image 400A to the operator of the data collection device 230 with a graphical pin over the starting point. The farming machine management system 220 may also display a graphical representation of the suggested route 510 on the field image 400A. The data collection device 230 may be equipped with a GPS and an IMU that provides location data and motion data of the data collection device 230 as it travels. The data collection device 230 may continuously provide the location data and the motion data to the farming machine management system 220 via the network 210 and the farming machine management system 220 may update the graphical representation of the suggested route 510 according to the location data and the motion data. The farming machine management system 220 may provide travel instructions to indicate a distance to travel before changing its direction. For example, from the starting point, the data collection device 230 may be instructed travel north for 800 m and then turn right.

As discussed with respect to FIGS. 4A and 4B, the suggested route 510 may be generated based on the satellite image 400A that does not include one or more obstructions that are currently present in the field 405. Therefore, the suggested route 510 may instruct the data collection device 230 to travel through the one or more of the lampposts 420, the silos 430, the driveway 425, the fence 440, and the pond 435 because the farming machine management system 220 was unaware of these obstructions when generating the suggested route 510.

Figure 5B:
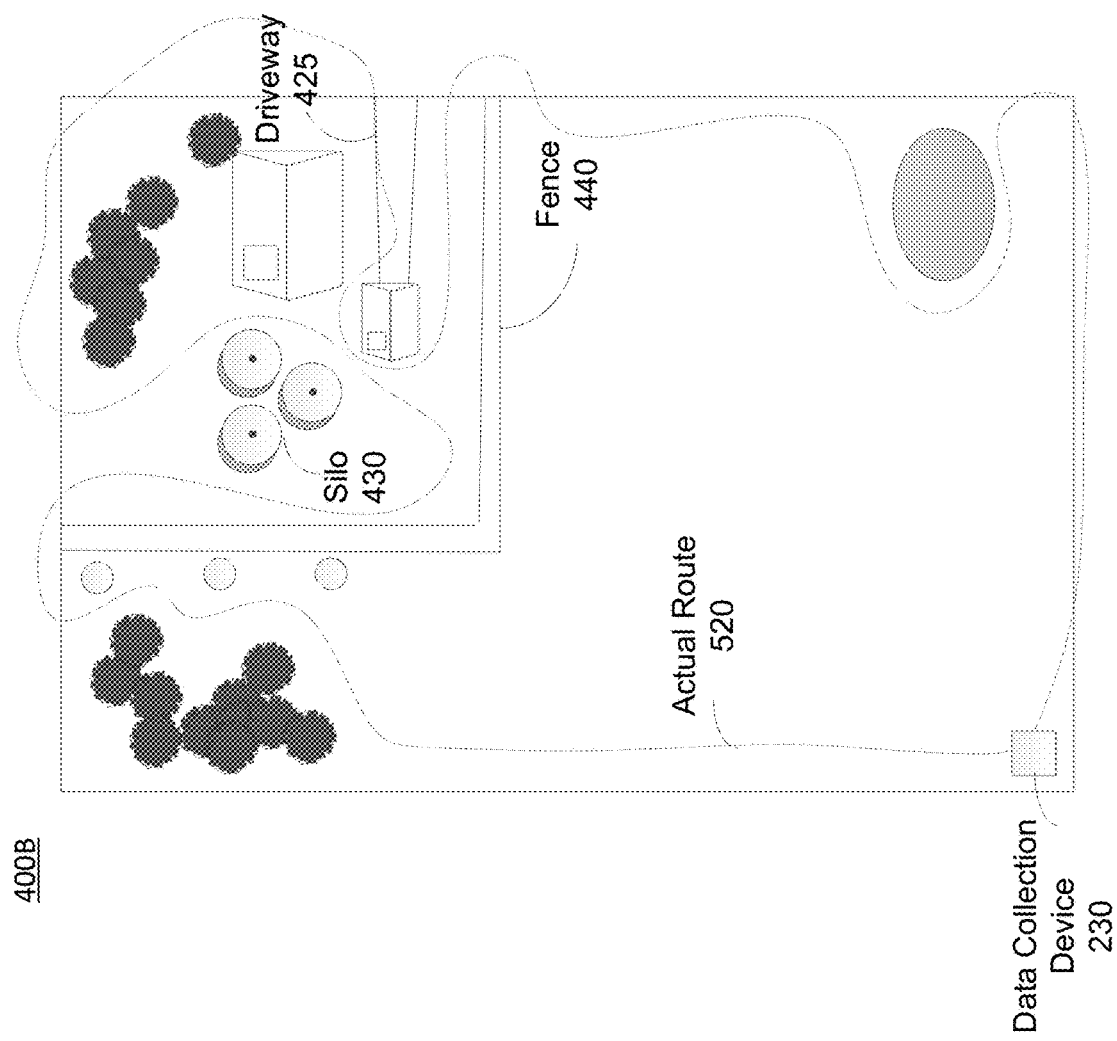
FIG. 5B illustrates an actual route taken for collecting location data associated with a field, in accordance with an embodiment of the present disclosure.

FIG. 5B illustrates an actual route 520 taken by the data collection device 230 for collecting location data associated with a field 230, in accordance with an embodiment of the present disclosure. The actual route 520 represents the location data collected by the data collection device 230 as it travels around the field. Based on the suggested route 510 received from the farming machine management system 220, the operator of the data collection device 230 travels through the field and collects information representing the current layout of the field 405. However, when the suggested route 510 instructs the operator to pass through obstructions, the operator may adjust the actual route 520 taken around the field. For example, instead of travelling through the fence 440 and the silos 430, the operator travels around the obstructions to collect more information describing the obstructions. The operator may circle around the obstructions to provide approximate shape and dimensions of the obstructions. The operator may also label the obstructions by identifying types of objects of the obstructions encountered along the suggested route 510. To label the obstructions, the operator may interact with the GUI to indicate a location at which the obstruction lies and the appropriate label of the obstruction. In some embodiments, the operator may also capture images of the obstructions.

Figure 6:
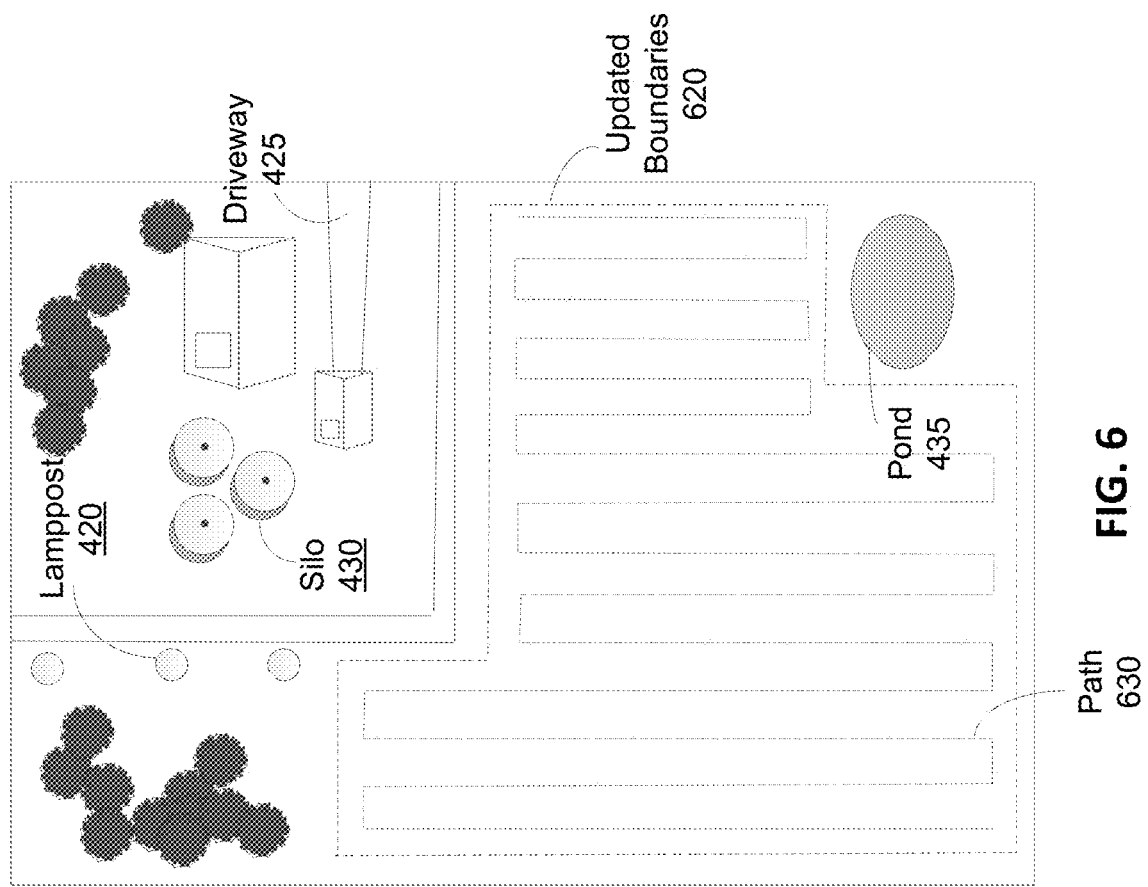
FIG. 6 illustrates updated boundaries of a field determined based on a satellite image and labelled location data, in accordance with an embodiment of the present disclosure.

FIG. 6 illustrates updated boundaries 620 of a field 405 determined based on the satellite image 400A and labelled location data, in accordance with an embodiment of the present disclosure. The farming machine management system 220 receives the labelled location data with information about the current layout of the field from the data collection device 230 and generates updated boundaries 620 that reflects an actual farmable land that the farming machine 100 can operate in. Compared to the predicted boundaries 440, the updated boundaries 620 may be different in size and in shape.

The updated boundaries 620 and/or the path 630 may be generated and provided to the verification device 240. The user associated with the verification device 240 (e.g., the farmer that owns the field) may review the updated boundaries 620 and/or the path 630 and provide feedback. If the updated boundaries 620 accurately represent the farmable area, the user may approve of the updated boundaries 620. Otherwise, the user may interact with a graphical representation of the updated boundaries 620 via the GUI displayed on the verification device 240 and provides feedback by identifying mistakes. If the user provides feedback, the farming machine management system 220 may regenerate the updated boundaries 620 based on the feedback and request further verification from the verification device 240. After the updated boundaries 620 are verified, the farming machine management system 200 may generate a path 630 for the farming machine 100.

Figure 7:
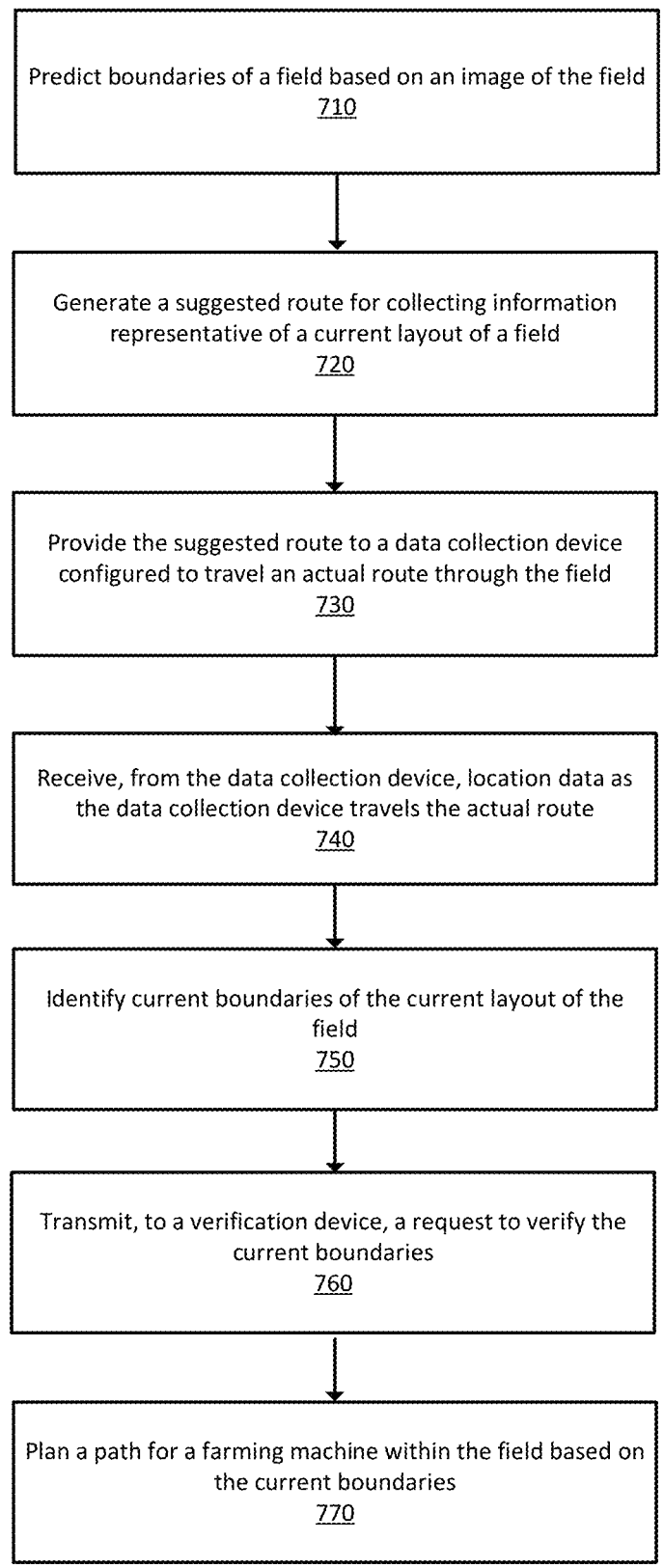
FIG. 7 illustrate a method of determining updated boundaries of a field, in accordance with an embodiment of the present disclosure.

FIG. 7 illustrates a method of determining updated boundaries of a field, in accordance with an embodiment of the present disclosure. In other embodiments, the steps may be performed in parallel, in different orders, or asynchronously, and in other embodiments, different steps may be performed.

A farming machine management system predicts boundaries of a field based on an image of the field. Based on the predicted boundaries, the farming machine management system generates 720 a suggested route for collecting information representative of a current layout of the field. The image of the field may be a satellite image. The information representative of the current layout is to be used for planning a path for a farming machine operating within the field.

The farming machine management system provides 730 the suggested route to a data collection device configured to travel an actual route through the field based on the suggested route. As the data collection device travels the actual route, the data collection device collects location data associated with the actual route using GPS.

The farming machine management system receives 740 location data from the data collection device as the data collection device travels the actual route. The location data may be labelled with information representing the current layout of the field such as information associated with additional obstructions in the current layout, obstructions at a different location, or obstructions that have been removed.

The farming machine management system compares the predicted boundaries to the labeled location data from the data collection device. Based on a comparison of the image of the field to the labelled location data, the farming machine management system identifies 750 current boundaries of the current layout of the field. The farming machine management system transmits 760 a request to verify the current boundaries to a verification device. After receiving a verification of the current boundaries, the farming machine management system plans 770 a path for a farming machine within the field based on the current boundaries.

VI. Control System

Figure 8:
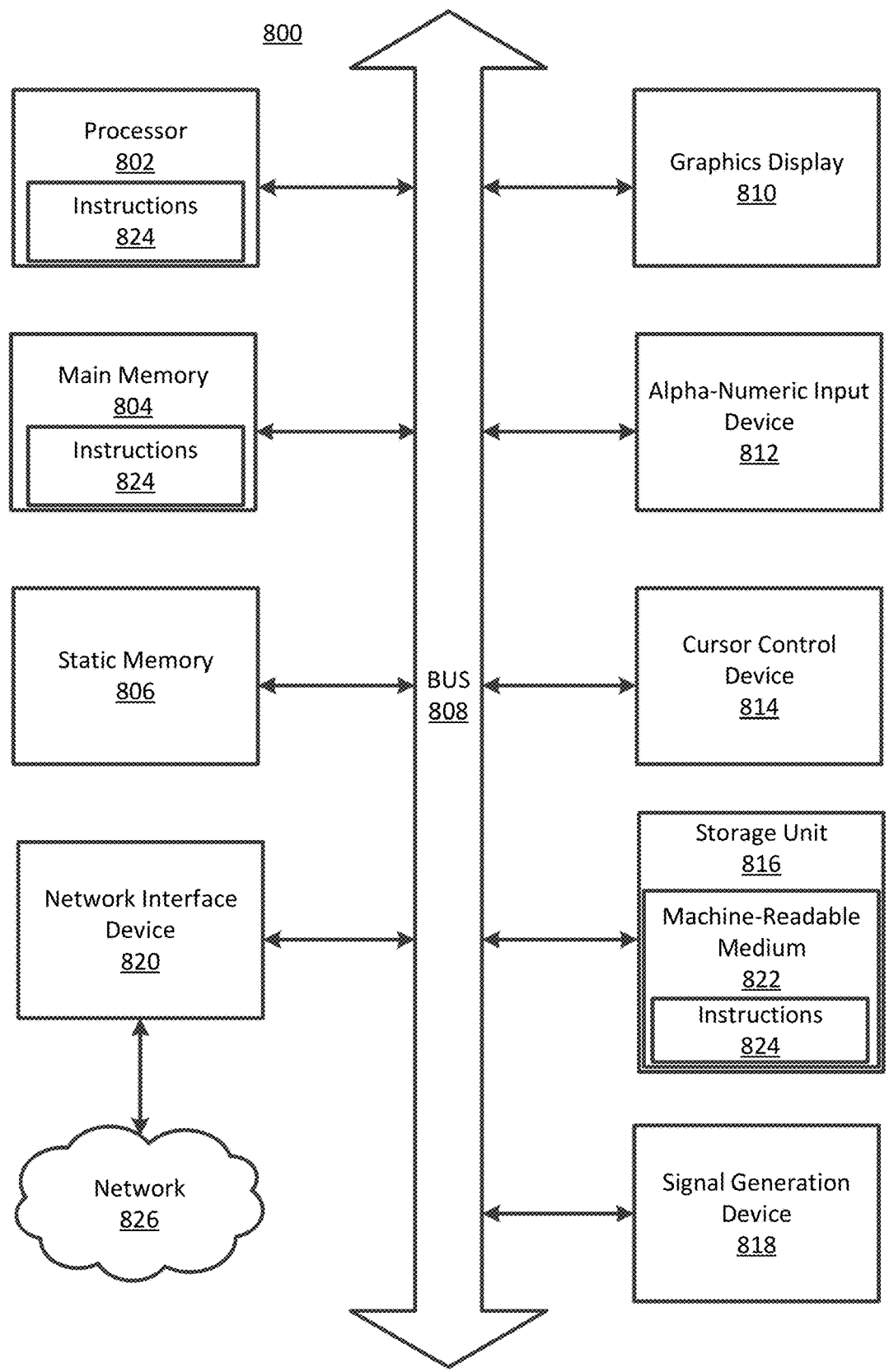
FIG. 8 is a block diagram illustrating components of an example machine for reading and executing instructions from a machine-readable medium, in accordance with one or more example embodiments.

FIG. 8 is a block diagram illustrating components of an example machine for reading and executing instructions from a machine-readable medium, in accordance with one or more example embodiments. Specifically, FIG. 8 shows a diagrammatic representation of control system 130 in the example form of a computer system 800. The computer system 800 can be used to execute instructions 824 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a client-server network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processing units (generally processor 1602). The processor 802 is, for example, a central processing unit (CPU), a graphics processing unit (GPU), a digital signal processor (DSP), a control system, a state machine, one or more application specific integrated circuits (ASICs), one or more radio-frequency integrated circuits (RFICs), or any combination of these. The computer system 800 also includes a main memory 804. The computer system may include a storage unit 816. The processor 802, memory 804, and the storage unit 816 communicate via a bus 808.

In addition, the computer system 800 can include a static memory 806, a graphics display 810 (e.g., to drive a plasma display panel (PDP), a liquid crystal display (LCD), or a projector). The computer system 800 may also include an alphanumeric input device 812 (e.g., a keyboard), a cursor control device 814 (e.g., a mouse, a trackball, a joystick, a motion sensor, or other pointing instrument), a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. For example, the instructions 824 may include the functionalities of modules of the system 130 described in FIG. 2. The instructions 824 may also reside, completely or at least partially, within the main memory 804 or within the processor 802 (e.g., within a processor's cache memory) during execution thereof by the computer system 1600, the main memory 804 and the processor 802 also constituting machine-readable media. The instructions 824 may be transmitted or received over a network 826 via the network interface device 820.

VII. Additional Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer physically mounted within a machine 100. This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for planning a path for a farming machine. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A method comprising:
   predicting boundaries of a field based on a previously captured image of the field;
   generating, using the predicted boundaries, a suggested route for collecting information representing current boundaries of the field, the suggested route comprising a path configured to verify the current boundaries of the field relative to the predicted boundaries of the field, wherein the predicted boundaries of the field are generated by applying a machine learning model to the previously captured image of the field to locate and identify obstructions within the boundaries of the field;
   providing the suggested route to a data collection device configured to:
     travel through the field based on the suggested route,
     collect location data associated with the suggested route, and
     label the location data with information representing a current layout of the field usable to verify the current boundaries;
   receiving, from the data collection device, the location data as the data collection device travels through the field based on the suggested route;
   identifying the current boundary of the field based on the current layout of the field based on a comparison of the image of the field to the received location data;
   transmitting, to a verification device, a request to verify the current boundaries; and
   responsive to receiving a verification of the current boundaries, planning the path for a farming machine within the field based on the current boundaries.

2. The method of claim 1, wherein identifying the predicted boundaries of the field further comprises:
   identifying an unobstructed region of the field based on locations of the identified obstructions; and
   determining boundaries of the unobstructed region.

3. The method of claim 1, wherein the suggested route provided to the data collection device is visually overlaid on the image of the field.

4. The method of claim 1, further comprising:
   providing the suggested route to the data collection device as a set of navigation instructions with respect to a starting point on the field, the data collection device configured to travel through the field collecting and labelling the location data based on the provided navigation instructions.

5. The method of claim 4, wherein collecting location data and labelling the location data further comprises:
   identifying types of objects associated with obstructions encountered as the data collection device travels; and
   labelling the location data with the identified types of objects.

6. The method of claim 1, wherein identifying the current boundaries based on the comparison of the image of the field to the received location data comprises:
   identifying an obstruction in the current layout that was not represented in the image of the field; and
   modifying the current boundaries to exclude the obstruction.

7. The method of claim 1, wherein identifying the current boundaries based on the comparison of the image of the field to the received location data comprises:
   determining a first location of an obstruction from the image of the field;

determining a second location of the obstruction from the received location data; and modifying the current boundaries based on a difference between the first location and the second location.

8. The method of claim 1, wherein identifying the current boundaries comprises applying a machine learning model to the image of the field and the received location data, the machine learning model trained using a training data of historical images of fields and historical location data and configured to output the current boundaries.

9. The method of claim 1, wherein planning the path for the farming machine further comprises:

identifying a type of the farming machine; and
planning the path based on the type of the farming machine.

10. A non-transitory computer-readable storage medium containing computer program code that, when executed by a processor, causes the processor to perform steps comprising:

predicting boundaries of a field based on a previously captured image of the field;
generating, using the predicted boundaries, a suggested route for collecting information representing current boundaries of the field, the suggested route comprising a path configured to verify the current boundaries of the field relative to the predicted boundaries of the field, wherein the predicted boundaries of the field are generated by applying a machine learning model to the previously captured image of the field to locate and identify obstructions within the boundaries of the field;
providing the suggested route to a data collection device configured to:
  travel through the field based on the suggested route,
  collect location data associated with the suggested route, and
  label the location data with information representing a current layout of the field usable to verify the current boundaries;
receiving, from the data collection device, the location data as the data collection device travels through the field based on the suggested route;
identifying the current boundary of the field based on the current layout of the field based on a comparison of the image of the field to the received location data;
transmitting, to a verification device, a request to verify the current boundaries; and
responsive to receiving a verification of the current boundaries, planning the path for a farming machine within the field based on the current boundaries.

11. The non-transitory computer-readable storage medium of claim 10, wherein identifying the predicted boundaries of the field further comprises:

identifying an unobstructed region of the field based on locations of the identified obstructions; and
determining boundaries of the unobstructed region.

12. The non-transitory computer-readable storage medium of claim 10, further containing computer program code that, when executed by the processor, causes the processor to perform:

providing the suggested route to the data collection device as a set of navigation instructions with respect to a starting point on the field, the data collection device configured to travel through the field collecting and labelling the location data based on the provided navigation instructions.

13. The non-transitory computer-readable storage medium of claim 12, wherein collecting location data and labelling the location data further comprises:

identifying types of objects associated with obstructions encountered as the data collection device travels; and
labelling the location data with the identified types of objects.

14. The non-transitory computer-readable storage medium of claim 10, wherein identifying the current boundaries based on the comparison of the image of the field to the received location data comprises:

identifying an obstruction in the current layout that was not represented in the image of the field; and
modifying the current boundaries to exclude the obstruction.

15. The non-transitory computer-readable storage medium of claim 10, wherein identifying the current boundaries based on the comparison of the image of the field to the received location data comprises:

determining a first location of an obstruction from the image of the field;
determining a second location of the obstruction from the received location data; and
modifying the current boundaries based on a difference between the first location and the second location.

16. The non-transitory computer-readable storage medium of claim 10, wherein identifying the current boundaries comprises applying a machine learning model to the image of the field and the received location data, the machine learning model trained using a training data of historical images of fields and historical location data and configured to output the current boundaries.

17. A system comprising:

one or more processors; and
a non-transitory computer-readable medium comprising computer program instructions that, when executed by the one or more processors, cause the one or more processors to perform operations comprising:
  predicting boundaries of a field based on a previously captured image of the field;
  generating, using the predicted boundaries, a suggested route for collecting information representing current boundaries of the field, the suggested route comprising a path configured to verify the current boundaries of the field relative to the predicted boundaries of the field, wherein the predicted boundaries of the field are generated by applying a machine learning model to the previously captured image of the field to locate and identify obstructions within the boundaries of the field;
  providing the suggested route to a data collection device configured to travel through the field based on the suggested route collect location data associated with the suggested route and label the location data with information representing a current layout of the field usable to verify the current boundaries;
  receiving, from the data collection device, the location data as the data collection device travels through the field based on the suggested route;
  identifying the current boundary of the field based on boundaries of the current layout of the field based on a comparison of the image of the field to the received location data;
  transmitting, to a verification device, a request to verify the current boundaries; and responsive to receiving a verification of the current boundaries, planning the path for a farming machine within the field based on the current boundaries.

18. The system of claim 17, wherein identifying the predicted boundaries of the field further comprises:
identifying an unobstructed region of the field based on locations of the identified obstructions; and
determining boundaries of the unobstructed region.

\* \* \* \* \*